Figure 1:
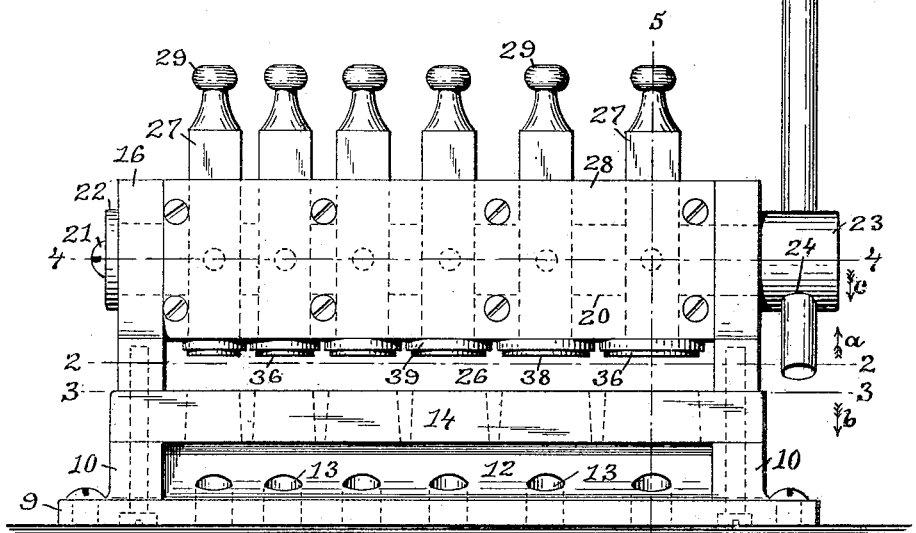

F. O. JAQUES, Jr.
SELECTIVE DENTAL DISK CUTTER.
APPLICATION FILED NOV. 2, 1914.

1,128,450.

Patented Feb. 16, 1915.

2 SHEETS—SHEET 1.

WITNESSES:
Wallis P. Luther
Madeleine M. Ryder

INVENTOR:
Fernando Oscar Jaques, Jr.,
by Chas. H. Luther
ATTORNEY

F. O. JAQUES, Jr.
SELECTIVE DENTAL DISK CUTTER.
APPLICATION FILED NOV. 2, 1914.
1,128,450.
Patented Feb. 16, 1915.
2 SHEETS—SHEET 2.
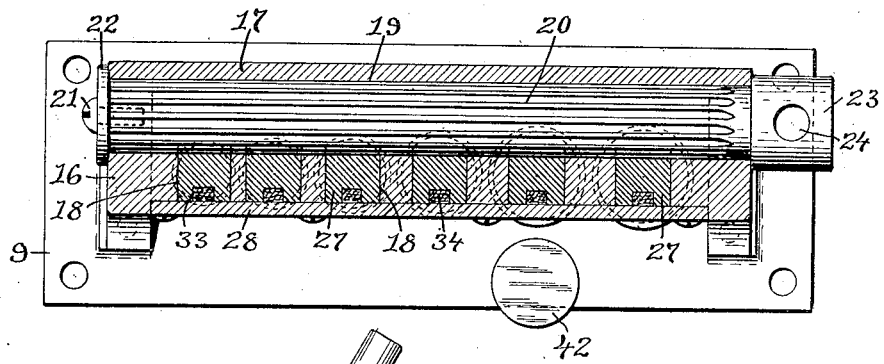
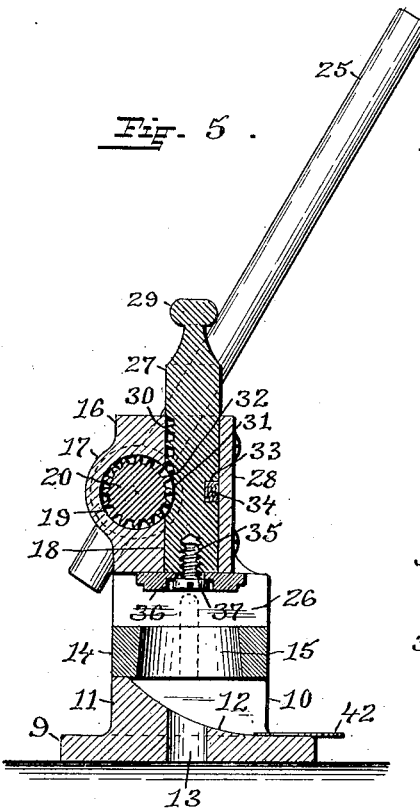
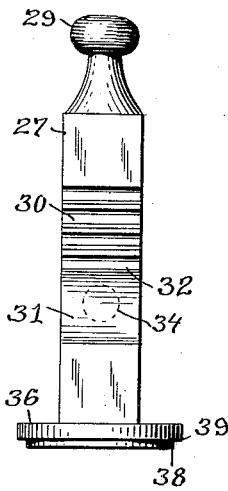
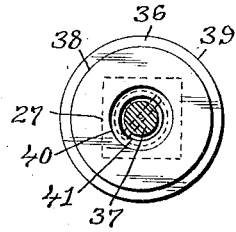
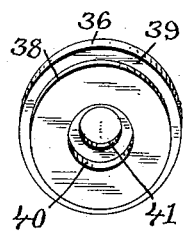
WITNESSES:
Wallis L. Luther
Madeleine M. Ryder
INVENTOR:
Fernando Oscar Jaques, Jr.,
by Chas. H. Luther
ATTORNEY.

UNITED STATES PATENT OFFICE.

FERNANDO OSCAR JAQUES, JR., OF CRANSTON, RHODE ISLAND, ASSIGNOR TO THE CENTRAL TOOL COMPANY, OF PROVIDENCE, RHODE ISLAND, A CORPORATION OF RHODE ISLAND.

SELECTIVE DENTAL DISK-CUTTER.

1,128,450.      Specification of Letters Patent.      Patented Feb. 16, 1915.

Application filed November 2, 1914. Serial No. 869,837.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Selective Dental Disk-Cutters, of which the following is a specification.

My invention has reference to an improvement in the art of dentistry and more particularly to an improvement in dental disk cutters for cutting out various sizes of disks of sheet gold or other precious metals, said disks forming the blanks from which dental shells are formed.

In the use of disk cutting machines having a plurality of different size cutters, and particularly in the art of dentistry, only one size disk is required to be cut out at any one time. As heretofore usually constructed, all of the various size cutters operate simultaneously when only one of the cutters should operate. This is detrimental as in cutting out the required size of disk the other cutters interfere and waste more or less of the sheet gold or other sheet metals used in forming dental shells.

The object of my invention is to improve the construction of a dental disk cutter having a plurality of plunger cutters whereby the operation of the cutters are made selective, that is to say, the size cutter required may be selected and brought into operation by a pressure of the finger on the top of the plunger carrying the cutter, while the remaining cutters remain in their normal inoperative positions.

Another object of my invention is to construct such a disk cutter so that when the required size of disk is cut out from the sheet gold, the disk will fall by gravity into a convenient position for removal by the operator.

Another object of my invention is to provide such a disk cutter with removable cutters so that the same may be easily replaced when required.

Final objects of my invention are to improve the construction, improve and simplify the operation and reduce the cost of manufacturing a selective dental disk cutter.

My invention consists in the peculiar and novel construction of a selective dental disk cutter, said disk cutter having details of construction, as will be more fully set forth hereinafter and claimed.

Figure 2:
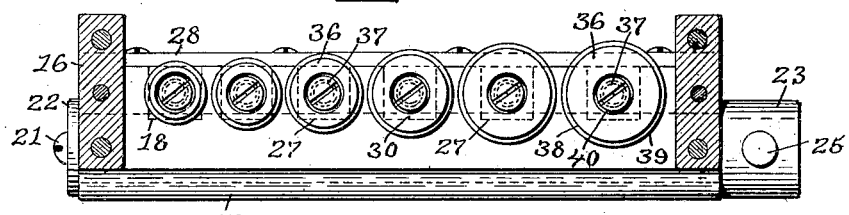
Figure 3:
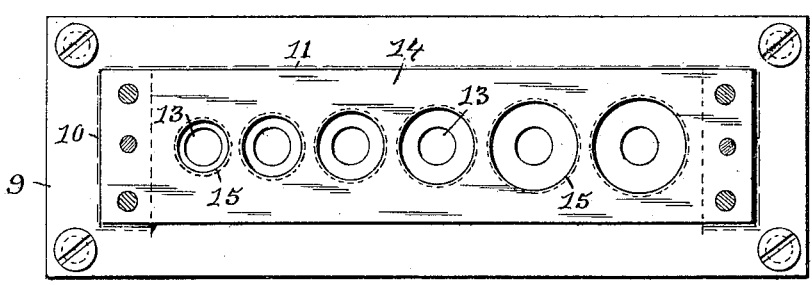

Figure 1, is a front view of my improved selective dental disk cutter. Fig. 2, is a longitudinal sectional view, through the cutter taken on line 2. 2., of Fig. 1, looking upward in the direction of the arrow *a*. Fig. 3, is a longitudinal sectional view similar to Fig. 2, taken on line 3. 3., of Fig. 1, looking downward in the direction of the arrow *b*. Fig. 4 is a longitudinal sectional view taken on line 4. 4., of Fig. 1, looking downward in the direction of the arrow *c*, showing the square plungers in section and the elongated pinion. Fig. 5 is a vertical transverse sectional view taken on line 5. 5., of Fig. 1, through the cutter. Fig. 6 is an enlarged back view of the plunger cutter removed from the machine. Fig. 7 is an enlarged face view of the cutter showing the fastening screw in section, and Fig. 8 is an enlarged perspective view of the cutter removed from the plunger.

In the drawings, 9 indicates a rectangular shaped base having the raised ends 10. 10., and raised connecting back portion 11 which merging downward into the base forms an inclined surface 12 which extends from the upper portion of the back 11, downward to the forward portion of the base between the ends 10. 10. A series of preferably six vertical screw-driver holes 13. 13., are formed in the base, as shown in Figs. 1, 3, and 5.

A rectangular shaped cutter plate 14 is placed over the ends 10. 10., and back 11 and has a series of preferably six downwardly enlarged openings 15. 15., on a line and of varying sizes, as shown in Fig. 3, the upper edges of the openings being formed into cutting edges.

An upper frame 16 is shaped to fit over the cutter plate 14 and has the raised body portion 17 in which are preferably six three sided vertical guide-ways 18, 18, in front and a transverse bore 19 which extends longitudinally the length of the frame at the back and intersects each one of the guide-ways 18, 18. An elongated pinion 20 is rotatably supported in and extends the length of the bore 19. This pinion is held in place at one end by a screw and washer 21 and 22 and at the opposite end by an enlarged head 23 having a transverse hole 24, for a detachable hand lever 25. The cutter plate 14 and the upper frame 16 are held in place and secured to the base by dowel pins and screws. The raised portion of the upper frame 16 forms a space 26 between the cutter plate 14 and the frame 16, and the screw-driver holes 12, 12, the openings 15, 15, and the guide-ways 18, 18, are in axial alinement.

A square plunger 27 is reciprocally secured in each of the guide-ways 18, 18 by a front plate 28 secured to the frame 16 by screws. Each plunger 27 is constructed to have a finger piece 29 at the top, a rack 30 on the back, a curved depression 31 in the back below the rack and merging into a semi-rack tooth 32, a small cavity 33, in the front in which is a leather friction plug 34 and a screw-threaded hole 35 in its lower end. The friction plugs 34 34 bear on the inner face of the front plate 28 and hold the plungers in their upper normal inoperative positions by friction. Each plunger 27 carries on its lower end a cutter 36 which corresponds in shape and size to the opening 15 which is directly under it in the cutter plate 14, and is secured to the plunger by a screw 37. Each cutter 36 is constructed to have a raised circular cutting edge 38, an outwardly extending annular lip 39 forming a stop, a central circular recess 40 for the head of the screw 37 and larger than the head of the screw and a central hole 41 which is larger than the shank of the screw 37.

In the operation of my improved selective dental disk cutter, a dentist requiring a certain size gold disk to form first a shell and then a crown, selects the required size cutter, places a finger on the finger piece 29 of the plunger 27 selected and presses down on the same and simultaneously moves the hand-lever 25 forward. This brings the rack 30 on the plunger into engagement with the pinion 20. A further forward movement of the hand-lever 25 forces the plunger 27 and the cutter 36 downward through the sheet gold, which has previously been placed on the cutter plate 14 under the selected cutter, thereby cutting out the required size disk of gold. The gold disk 42 now falls by gravity through the opening 15 in the cutter plate 14 on to the inclined surface 12 and slides outward to the front of the base, as shown in Fig. 4, into a convenient position for removal. On a reverse movement of the hand-lever 25 the plunger is raised a predetermined distance until a tooth on the pinion 20 engages with the lower curved side of the semi-rack tooth 32, which lifts the plunger still farther so as to bring the rack out of engagement with the pinion. The plunger is now held in its upward normal inoperative position by friction of the leather plug 34 on the front plate 28, as shown in Fig. 5, with the rack entirely out of engagement with the pinion. The pinion is now free to turn in the curved depression 31 in the plunger and the handle may be moved into any convenient position by the operator for the next operation. When it is necessary to replace a worn out cutter the same is removed, a new cutter is placed in its coinciding opening in the cutter plate, the plunger brought down on to the cutter, a screw 37 inserted and the cutter firmly secured in place by a screw-driver through the screw-hole 13, tightening the screw 37. By having the recess 40 and hole 41 larger than the head and shank of the screw 37, the cutter is adjustable on the end of the plunger before the screw 37 is tightened.

By my improved construction and method of operation any selected cutter may be brought into operation while all of the others remain in their normal inoperative positions, the hand-lever 25 may be brought into any convenient position for the operator, the cutter is adjustable for position on the plunger by first placing the cutter in its corresponding opening in the cutter plate, the actual cutting movement of the cutter is limited to the movement that is required by the annular lip on the cutter engaging with the cutter plate, the cut out disk is brought into a convenient position for removal and a more convenient and perfect dental disk cutter is provided for the use of dentists than has heretofore been done.

I do not wish to confine myself to the exact construction shown, as the shape of the cutters could be varied and other details could be changed within the scope of the appended claims.

Having thus described my invention I claim as new:—

1. A selective dental disk cutter, comprising a base having a series of screw-driver holes, a cutter plate having a series of graduated openings, a frame, a series of plungers reciprocally supported in the frame, graduated cutters adjustably secured to the plungers, each plunger and its cutter, corresponding opening in the cutter plate and corresponding screw-driver hole in the base being in axial alinement, means for holding the plungers in their normal inoperative position by friction, an operating mechanism, and means for independently engaging a selected plunger with the operating mechanism.

2. A selective dental disk cutter comprising a base having a downwardly inclined upper face and a series of screw-driver holes, a cutter plate on the base and having a series of graduated openings, a frame on the cutter plate, a series of plungers reciprocally supported in the frame, graduated cutters adjustably secured to the plungers, means for holding the plungers in their normal inoperative positions by friction, an operating mechanism and means for independently engaging a selected plunger with the operating mechanism.

3. A selective dental disk cutter, comprising a base having a downwardly inclined upper face and a series of screw-driver holes, a cutter plate on the base and having a series of graduated openings, a frame on the cutter plate, a series of plungers each having a rack and reciprocally supported in the frame, graduated cutters adjustably secured to the plungers, means for holding the plungers in their normal inoperative positions by friction, an elongated pinion in a position to engage with the racks on the plungers, and means for operating the pinion, whereby on rotating the pinion and simultaneously depressing a plunger the selected plunger is operatively connected with the pinion.

4. A selective dental disk cutter, comprising a base having a downwardly inclined upper face and a series of screw-driver holes, a cutter plate on the base and having a series of graduated openings over the screw-driver holes, a frame on the cutter plate, a series of plungers each having a rack and reciprocally supported in the frame over the openings in the cutter plate, graduated cutters adjustably secured to the lower ends of the plungers, means for holding the plungers in their normal inoperative positions by friction, an elongated pinion rotatably supported in the frame in a position to engage with the racks on the plungers, means for operating the pinion, whereby on rotating the pinion and simultaneously depressing a plunger the selected plunger is operatively connected with the pinion.

5. In a selective dental disk cutter, a frame, a pinion rotatably supported in the frame, a plunger reciprocally supported in the frame and having a finger piece on its upper end, a rack on the back, a curved depression in the back terminating in a semi-rack tooth, a cavity in the front, a friction plug in the cavity, a screw threaded hole in its lower end, a cutter adjustably secured by a screw in the screw-threaded hole, said cutter having an annular cutting edge, an annular lip, a central recess larger than the head of the screw, and a central hole larger than the shank of the screw and means for rotating the pinion.

In testimony whereof, I have signed my name to this specification in the presence of two subscribing witnesses.

FERNANDO OSCAR JAQUES, Jr.

Witnesses:
JOHN H. McNULTY,
CHAS. H. LUTHER.

Copies of this patent may be obtained for five cents each, by addressing the "Commissioner of Patents, Washington, D. C."